(12) United States Patent
Near et al.

(10) Patent No.: US 7,637,458 B2
(45) Date of Patent: Dec. 29, 2009

(54) SYSTEMS AND METHODS FOR PROVIDING BACK-UP HYDRAULIC POWER FOR AIRCRAFT, INCLUDING TANKER AIRCRAFT

(75) Inventors: Daniel R. Near, Rose Hill, KS (US); Mark S. Petty, Wichita, KS (US)

(73) Assignee: The Boeing Company, Chicago, IL (US)

( * ) Notice: Subject to any disclaimer, the term of this patent is extended or adjusted under 35 U.S.C. 154(b) by 523 days.

(21) Appl. No.: 11/440,816

(22) Filed: May 24, 2006

(65) Prior Publication Data

US 2007/0069071 A1 Mar. 29, 2007

Related U.S. Application Data

(60) Provisional application No. 60/689,129, filed on Jun. 8, 2005.

(51) Int. Cl.
*B64C 13/36* (2006.01)
(52) U.S. Cl. .................. 244/78.1; 244/135 A
(58) Field of Classification Search .............. 244/78.1, 244/78.2, 226, 135 A; 303/10–13
See application file for complete search history.

(56) References Cited

U.S. PATENT DOCUMENTS

| 724,675 | A | 4/1903 | Decker |
|---|---|---|---|
| 2,091,916 | A | 8/1937 | Evans |
| 2,213,680 | A | 9/1940 | Share |
| 2,414,509 | A | 1/1947 | Andre |
| 2,453,553 | A | 11/1948 | Tansley |
| 2,475,635 | A | 7/1949 | Parsons |
| 2,552,991 | A | 5/1951 | McWhorter |
| 2,668,066 | A | 2/1954 | Stadelhofer |
| 2,670,913 | A | 3/1954 | Castor et al. |
| 2,712,831 | A | 7/1955 | Day |

(Continued)

FOREIGN PATENT DOCUMENTS

DE 2744674 4/1979

(Continued)

OTHER PUBLICATIONS

Jensen, David, "Smart Tanker," Avionics Magazine; http://www.aviationtoday.com/pring/av/categories/miliray/669;html; Jan. 1, 2003; 5 pgs.

(Continued)

*Primary Examiner*—Tien Dinh
(74) *Attorney, Agent, or Firm*—Perkins Coie LLP

(57) ABSTRACT

Systems and methods for providing back-up hydraulic power for aircraft are disclosed. A system in accordance with one aspect of the invention includes a hydraulic supply line, a hydraulic return line, and a hydraulic actuator coupled between the supply line and the return line. The system can further include a fluid energy storage device coupled in parallel with the hydraulic actuator between the supply line and the return line, and a first valve (e.g., check valve) coupled in series between the supply line and the fluid energy storage device. A second control valve can control the flow of fluid from the fluid energy storage device to the actuator. In particular embodiments, the fluid energy storage can be coupled to an actuator that deploys and retracts an aerial refueling device.

21 Claims, 4 Drawing Sheets

U.S. PATENT DOCUMENTS

| | | | |
|---|---|---|---|
| 2,859,002 A | 11/1958 | Leisy | |
| 2,875,787 A | 3/1959 | Evans | |
| 2,879,017 A | 3/1959 | Smith | |
| 2,919,937 A | 1/1960 | Dovey | |
| 2,941,761 A | 6/1960 | Cox et al. | |
| 2,946,543 A | 7/1960 | Gordon et al. | |
| 2,953,332 A | 9/1960 | Cobham et al. | |
| 2,954,190 A | 9/1960 | Le Clair | |
| 2,960,295 A | 11/1960 | Schulz | |
| 2,967,684 A | 1/1961 | Knecht | |
| 2,973,171 A | 2/1961 | Ward et al. | |
| 3,061,246 A | 10/1962 | Kirby | |
| 3,063,470 A | 11/1962 | Forster | |
| 3,091,419 A | 5/1963 | Mosher | |
| 3,103,234 A | 9/1963 | Washburn | |
| 3,108,769 A | 10/1963 | Hieber | |
| 3,206,232 A | 9/1965 | Gleason | |
| 3,680,311 A | 8/1972 | Jacques Harbonn et al. | |
| 3,747,873 A | 7/1973 | Layer et al. | |
| 3,836,117 A | 9/1974 | Panicali | |
| 3,917,196 A | 11/1975 | Pond et al. | |
| 3,928,903 A | 12/1975 | Richardson et al. | |
| 4,044,834 A | 8/1977 | Perkins | |
| 4,072,283 A | 2/1978 | Weiland | |
| 4,088,154 A | 5/1978 | Patton et al. | |
| 4,095,761 A | 6/1978 | Anderson et al. | |
| 4,119,294 A * | 10/1978 | Schnorrenberg | 251/129.08 |
| 4,129,270 A | 12/1978 | Robinson et al. | |
| 4,149,739 A | 4/1979 | Morris | |
| 4,150,803 A | 4/1979 | Fernandez | |
| 4,231,536 A | 11/1980 | Ishimitsu et al. | |
| 4,327,784 A | 5/1982 | Denniston | |
| 4,408,943 A | 10/1983 | McTamaney et al. | |
| 4,438,793 A | 3/1984 | Brown | |
| 4,471,809 A | 9/1984 | Thomsen et al. | |
| 4,477,040 A | 10/1984 | Karanik | |
| 4,534,384 A | 8/1985 | Graham et al. | |
| 4,540,144 A | 9/1985 | Perrella | |
| 4,586,683 A | 5/1986 | Kerker | |
| 4,612,089 A | 9/1986 | Hauptmann | |
| 4,665,936 A | 5/1987 | Furrer | |
| H297 H | 7/1987 | Schultz | |
| 4,796,838 A | 1/1989 | Yamamoto | |
| 4,883,102 A | 11/1989 | Gabrielyan et al. | |
| 4,929,000 A | 5/1990 | Annestedt, Sr. | |
| 5,131,438 A | 7/1992 | Loucks | |
| 5,141,178 A | 8/1992 | Alden et al. | |
| 5,255,877 A | 10/1993 | Lindgren et al. | |
| 5,326,052 A | 7/1994 | Krispin et al. | |
| 5,393,015 A * | 2/1995 | Piasecki | 244/135 A |
| 5,427,333 A | 6/1995 | Kirkland | |
| 5,449,203 A | 9/1995 | Sharp | |
| 5,449,204 A | 9/1995 | Greene et al. | |
| 5,499,784 A | 3/1996 | Crabere et al. | |
| 5,530,650 A | 6/1996 | Biferno et al. | |
| 5,539,624 A | 7/1996 | Dougherty | |
| 5,573,206 A | 11/1996 | Ward | |
| 5,785,276 A | 7/1998 | Ruzicka | |
| 5,810,292 A | 9/1998 | Garcia, Jr. et al. | |
| 5,904,729 A | 5/1999 | Ruzicka | |
| 5,906,336 A | 5/1999 | Eckstein | |
| 5,921,294 A | 7/1999 | Greenhalgh et al. | |
| 5,996,939 A | 12/1999 | Higgs et al. | |
| 6,076,555 A | 6/2000 | Hettinger | |
| 6,119,981 A | 9/2000 | Young et al. | |
| 6,145,788 A | 11/2000 | Mouskis et al. | |
| 6,302,448 B1 | 10/2001 | Van Der Meer et al. | |
| 6,324,295 B1 | 11/2001 | Valery et al. | |
| 6,326,873 B1 | 12/2001 | Faria et al. | |
| 6,375,123 B1 | 4/2002 | Greenhalgh et al. | |
| 6,428,054 B1 | 8/2002 | Zappa et al. | |
| 6,454,212 B1 * | 9/2002 | Bartov | 244/135 A |
| 6,464,173 B1 | 10/2002 | Bandak | |
| 6,467,725 B1 | 10/2002 | Coles et al. | |
| 6,588,465 B1 | 7/2003 | Kirkland et al. | |
| 6,598,830 B1 | 7/2003 | Ambrose et al. | |
| 6,601,800 B2 | 8/2003 | Ollar | |
| 6,604,711 B1 | 8/2003 | Stevens et al. | |
| 6,651,933 B1 | 11/2003 | von Thal et al. | |
| 6,669,145 B1 | 12/2003 | Green | |
| 6,676,379 B2 | 1/2004 | Eccles et al. | |
| 6,752,357 B2 | 6/2004 | Thal et al. | |
| 6,779,758 B2 | 8/2004 | Vu et al. | |
| 6,796,527 B1 | 9/2004 | Munoz et al. | |
| 6,819,982 B2 | 11/2004 | Doane | |
| 6,824,105 B2 | 11/2004 | Edwards et al. | |
| 6,832,743 B2 | 12/2004 | Schneider et al. | |
| 6,837,462 B2 | 1/2005 | von Thal et al. | |
| 6,848,720 B2 | 2/2005 | Carns et al. | |
| 7,108,015 B2 | 9/2006 | Lombari et al. | |
| 7,213,787 B2 | 5/2007 | Carns et al. | |
| 7,293,741 B2 | 11/2007 | Carns et al. | |
| 7,380,754 B2 | 6/2008 | James et al. | |
| 2003/0038214 A1 | 2/2003 | Bartov | |
| 2003/0097658 A1 | 5/2003 | Richards | |
| 2003/0115863 A1 | 6/2003 | Holt et al. | |
| 2003/0136874 A1 | 7/2003 | Gjerdrum | |
| 2004/0129865 A1 | 7/2004 | Doane | |
| 2004/0195909 A1 | 10/2004 | Hamzeh et al. | |
| 2005/0055143 A1 | 3/2005 | Doane | |
| 2006/0000949 A1 | 1/2006 | Schroeder | |
| 2006/0011782 A1 | 1/2006 | Schroeder | |
| 2006/0038076 A1 | 2/2006 | Schroeder | |
| 2006/0278763 A1 | 12/2006 | Carns et al. | |

FOREIGN PATENT DOCUMENTS

| | | |
|---|---|---|
| DE | 29901583 | 5/1999 |
| DE | 10013751 | 10/2001 |
| EP | 0236584 | 9/1987 |
| EP | 0780292 | 6/1997 |
| EP | 0807577 | 11/1997 |
| EP | 1094001 | 4/2001 |
| EP | 1361156 | 11/2003 |
| EP | 1447605 | 8/2004 |
| EP | 1695911 | 8/2006 |
| GB | 555984 | 9/1943 |
| GB | 2237251 | 1/1991 |
| GB | 2257458 | 1/1993 |
| GB | 2373488 | 9/2002 |
| GB | 2405384 | 3/2005 |
| IL | 128459 | 5/2003 |
| RU | 2111154 | 5/1998 |
| RU | 2140381 | 10/1999 |
| RU | 2142897 | 12/1999 |
| SU | 673798 | 7/1979 |
| SU | 953345 | 8/1982 |
| TW | 386966 | 4/2000 |
| WO | WO-91/06471 | 5/1991 |
| WO | WO-97/33792 | 9/1997 |
| WO | WO-98/07623 | 2/1998 |
| WO | WO-98/39208 | 9/1998 |
| WO | WO-98/54053 | 12/1998 |
| WO | WO-02/24529 | 3/2002 |
| WO | WO-02055385 | 7/2002 |
| WO | WO-02/076826 | 10/2002 |
| WO | WO-03/102509 | 12/2003 |

OTHER PUBLICATIONS

International Search Report for EP06252940.9; The Boeing Company; Aug. 29, 2006; 9 pgs; European Patent Office.
U.S. Appl. No. 11/067,331, filed Feb. 25, 2005, Crangle.
U.S. Appl. No. 11/078,210, filed Mar. 11, 2005, Smith.

U.S. Appl. No. 11/157,245, filed Jun. 20, 2005, Takacs et al.
U.S. Appl. No. 11/217,696, filed Sep. 1, 2005, Schuster et al.
U.S. Appl. No. 11/258,819, filed Oct. 26, 2005, Cutler et al.
Flug Revue, "Airbus (Air Tanker) A330-200 Tanker," Jan 26, 2004; www.flug-revue.rotor.com/FRTypen/FRA3302T.htm; Motorp-Presse Stuttgart, Bonn, German, (5 pgs).

Keller, George R., "Hydraulic System Analysis", pp. 40-41, 1985, Hydraulics & Pheumatics, Cleveland, Ohio.
Thales Avionics Ltd., "Air Tanker Bids for Future Strategic Tanker Aircraft," Jul. 3, 2001; www.thalesavionics.net/press/pr43.html; (3 pgs).

* cited by examiner

SYSTEMS AND METHODS FOR PROVIDING BACK-UP HYDRAULIC POWER FOR AIRCRAFT, INCLUDING TANKER AIRCRAFT

CROSS-REFERENCE TO RELATED APPLICATION

The present application claims priority to U.S. Provisional Application 60/689,129, filed Jun. 8, 2005 and incorporated herein by reference.

TECHNICAL FIELD

The present invention is directed generally toward systems and methods for providing back-up hydraulic power for aircraft, including tanker aircraft. In particular aspects of the invention, such power can be provided to a refueling device, e.g., a refueling boom actuator.

BACKGROUND

In-flight refueling (or air-to-air refueling) is an important method for extending the range of aircraft traveling long distances over areas having no feasible landing or refueling points. Although in-flight refueling is a relatively common operation, especially for military aircraft, the aircraft to be refueled (e.g., the receiver aircraft) must be precisely positioned relative to the tanker aircraft in order to provide safe engagement while the fuel is dispensed to the receiver aircraft. The requirement for precise relative spatial positioning of the two rapidly moving aircraft makes in-flight refueling a challenging operation.

There are currently two primary systems for in-flight refueling. One is a hose and drogue system, which includes a refueling hose having a drogue disposed at one end. The hose and drogue are trailed behind the tanker aircraft once the tanker aircraft is on station. The pilot of the receiver aircraft then flies the receiver aircraft to intercept and couple with the drogue for refueling. Another existing system is a boom refueling system. The boom refueling system typically includes a rigid boom extending from the tanker aircraft with a probe and nozzle at the distal end. The boom also includes airfoils controlled by a boom operator stationed on the refueling aircraft. The airfoils allow the boom operator to actively maneuver the boom with respect to the receiver aircraft, which flies in a fixed refueling position below and aft of the tanker aircraft.

Another challenge associated with tanker aircraft stems from the fact that the tanker aircraft deploy the hose and/or boom during refueling operations. If the hydraulic system that powers actuators used to deploy and retract the hose and/or boom fail, the aircraft must rely on a redundant system to stow these devices before landing. Accordingly, tanker aircraft typically include redundant systems that provide this capability. However, a drawback with such redundant systems is that they add weight and complexity to the tanker aircraft and can accordingly reduce the range of the aircraft and/or the overall operational efficiency of the aircraft.

FIG. 4 is a schematic illustration of a portion of an aircraft hydraulic system 10 that is used on existing aircraft, including tanker aircraft. The hydraulic system 10 can provide hydraulic power to an aircraft parking brake 12. Accordingly, the hydraulic system 10 can provide power to the brake 12 via a simple accumulator 30 after hydraulic pressure has been depleted. A control valve 18 controls the application of hydraulic fluid to the brake 12. The pressurized hydraulic fluid is provided by an aircraft hydraulic supply line 13 (via a check valve 15) and returned via an aircraft hydraulic return line 14. The accumulator operates against pressure provided by a gas charge 17 so as to store energy for use when the aircraft is powered down. In other installations, a similar (simple) accumulator can be used to store hydraulic power for high demand periods. While the foregoing hydraulic system is suitable for its intended use, it does not address the weight and complexity associated with redundant systems described above.

SUMMARY

The following summary is provided for the benefit of the reader only, and does not limit the invention. Aspects of the invention are directed generally to aircraft systems. One such system can include a hydraulic fluid source, a hydraulic supply line coupled to the hydraulic fluid source, a hydraulic return line coupled to the hydraulic fluid source, and a hydraulic aircraft actuator coupled between the hydraulic supply line and the hydraulic return line. The system can further have a fluid energy storage device that includes a self-displacing accumulator coupled to at least one of the hydraulic supply line and the hydraulic return line, and a first valve coupled between the fluid energy storage device and the hydraulic supply line and/or the hydraulic return line. The first valve can prevent or at least restrict a flow of hydraulic fluid from the fluid energy storage device to at least one of the hydraulic supply line and the hydraulic return line. The system can still further include a second, control valve coupled between the fluid energy storage device and the actuator. The control valve can be changeable between a first configuration (e.g., a closed position) in which the control valve at least restricts fluid flow between the energy storage device and the actuator, and a second configuration (e.g., an open position) in which the control valve allows a flow of fluid to the actuator at least sufficient to operate the actuator.

In particular embodiments, the system can further include a controller coupled to the control valve to move the control valve between the closed position and the open position. The controller can be a manual controller, a partially automated controller, or a fully automated controller coupled to a sensor to automatically open the control valve in response to a sensed reduction in system performance.

In still further particular embodiments, the system can further include a tanker aircraft carrying the hydraulic supply line, the hydraulic return line, the hydraulic actuator, the fluid energy storage device, the first valve, and the control valve. The system can also include a refueling device carried by the tanker aircraft. The hydraulic actuator can be coupled to the refueling device to move the refueling device between a stowed position and a deployed position. Accordingly, the fluid energy storage device can provide a redundant energy source for controlling the refueling device actuator (or other aircraft actuator) when a selected condition (e.g., a reduction in hydraulic system performance) occurs.

The invention is also directed toward methods for operating an aircraft system. In one embodiment, such a method can include pressurizing an aircraft hydraulic system and storing hydraulic energy provided by the hydraulic system in a fluid energy storage device that includes a self-displacing accumulator. The method can further include actively preventing (or at least restricting) energy stored in the fluid energy storage device from returning to the rest of the hydraulic system during a first phase of operations, and, during a second phase of operations, actively releasing energy stored in the fluid energy storage device to at least one actuator of the aircraft. In particular embodiments, the first phase of operations can include normal operations, and the second phase of operations can include operations after at least a portion of the hydraulic system has failed. Accordingly, the fluid energy storage device can provide a back-up source of power for the at least one actuator in the event of a failure of another portion of the hydraulic system.

DETAILED DESCRIPTION

The present disclosure describes hydraulic systems having accumulators and/or other fluid energy storage devices that can provide a back-up hydraulic power capability, and also discloses associated methods. Certain specific details are set forth in the following description and in FIGS. 1-3 to provide a thorough understanding of various embodiments of the invention. These details are provided in the context of a refueling aircraft, but in at least some instances, may be applied to other aircraft as well. Well-known structures, systems and methods often associated with such systems have not been shown or described in detail to avoid unnecessarily obscuring the description of the various embodiments of the invention. In addition, those of ordinary skill in the relevant art will understand that additional embodiments of the invention may be practiced without several of the details described below.

At least some embodiments of the invention may take the form of computer-executable instructions, including routines executed by a programmable computer or other type of controller. Those skilled in the relevant art will appreciate that the invention can be practiced on computer systems other than those shown and described below. The invention can be embodied in a special-purpose computer or data processor that is specifically programmed, configured or constructed to perform one or more of the computer-executable instructions described below. Accordingly, the term "computer" as generally used herein refers to any data processor and can include multi-processor systems and/or networks. Aspects of the invention described below may be stored or distributed on computer-readable media, including magnetically readable or removable computer disks, as well as distributed over networks. Data structures and transmissions of data particular to aspects of the invention are also encompassed within the scope of the invention.

Figure 1:
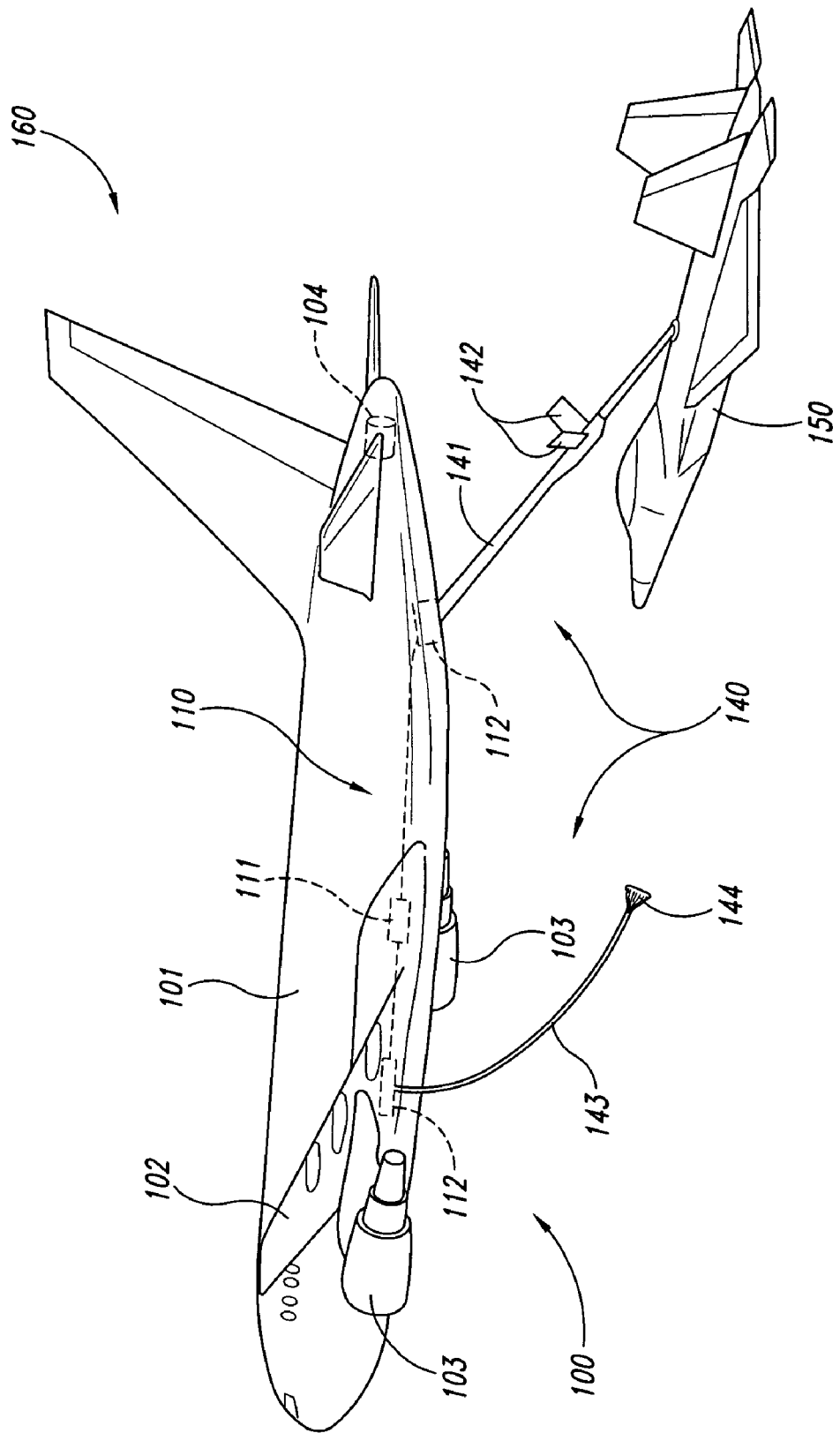
FIG. 1 is a partially schematic, isometric illustration of a tanker aircraft having a hydraulic system configured in accordance with an embodiment of the invention.

FIG. 1 illustrates an overall refueling platform 160 that includes a tanker aircraft 100 positioned to couple with and refuel a receiver aircraft 150, using an aerial refueling device 140 configured in accordance with an embodiment of the invention. The tanker aircraft 100 has a fuselage 101, wings 102, and one or more engines 103 (two are shown in FIG. 1 as being carried by the wings 102). The aircraft can include additional power sources, for example, an auxiliary power unit (APU) 104 located in the tail section of the aircraft.

The refueling device 140 can include a boom-type system. For example, the refueling device 140 can include a boom 141 having actuatable control surfaces 142. The positions of the control surfaces 142 can be adjusted to "fly" the boom 141 into engagement with the receiver aircraft 150. An actuator 112 can operate to deploy the boom 141 for refueling, and stow the boom 141 prior to landing. In at least one embodiment, the actuator 112 can be hydraulically driven. Accordingly, the actuator 112 can form a portion of a hydraulic system 110 that also includes a hydraulic source 111. The hydraulic source 111 can in turn include a compressor or pump that receives power from the engines 103 or the APU 104, and pressurizes hydraulic fluid which drives the actuator 112. The hydraulic source 111 can also include a fluid reservoir and associated filter systems.

The refueling device 140 can include a hose and drogue system in addition to or in lieu of the boom system described above. The hose and drogue system can include a deployable hose 143 carrying drogue 144. The hose 143 may be coupled to an actuator 112 that reels the hose 143 on-board and off-board the aircraft 100. Such an actuator 112 may also be hydraulically driven, and can accordingly form a portion of the hydraulic system 110.

Figure 2:
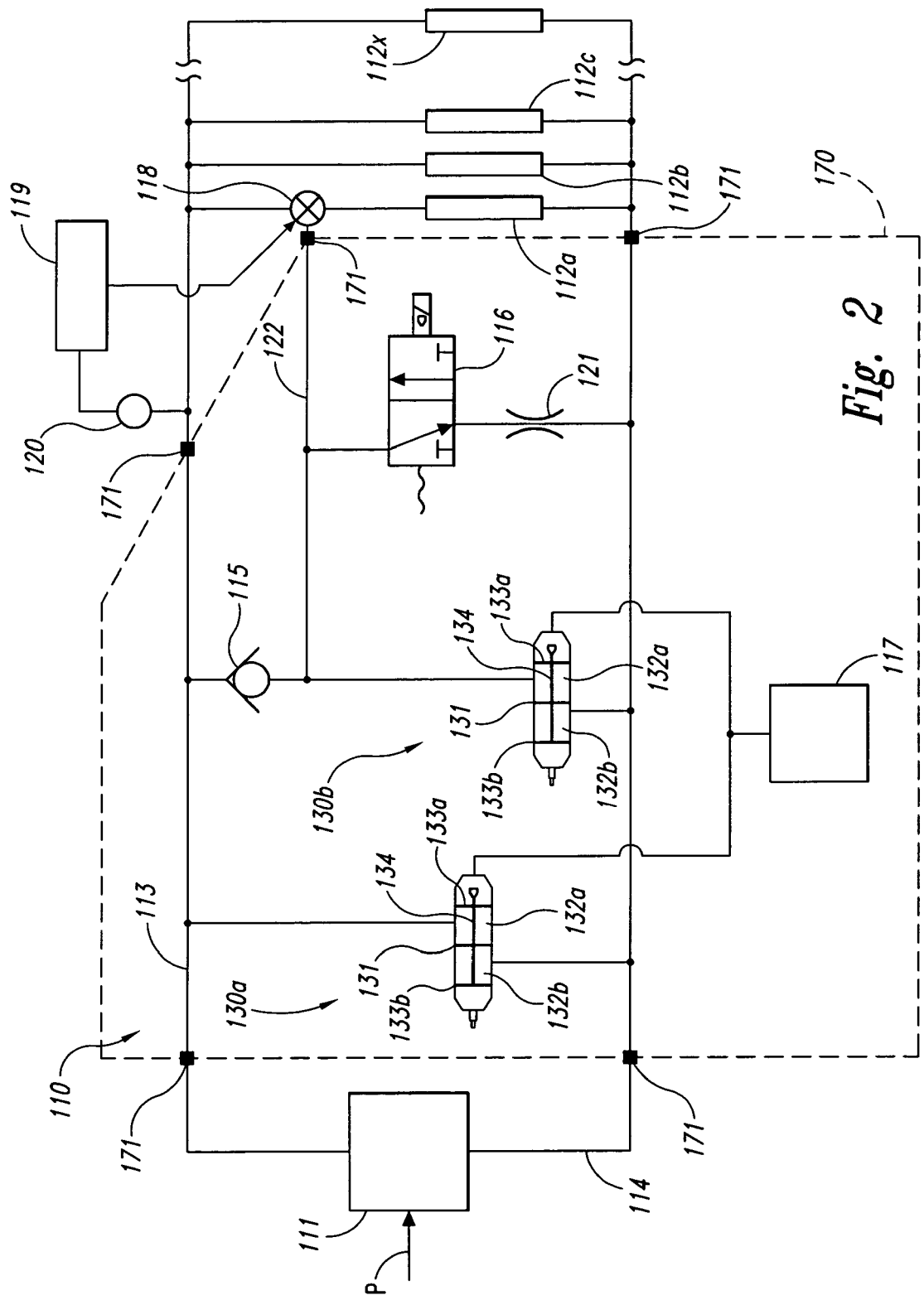
FIG. 2 is a schematic illustration of portions of the hydraulic system shown in FIG. 1.

FIG. 2 is a schematic illustration of the hydraulic system 110 shown in FIG. 1. The hydraulic source 111 receives input power as indicated by arrow P and provides pressurized hydraulic fluid via a supply line 113. One or more actuators 112 (shown in FIG. 2 as actuators 112a, 112b, 112c ... 112x) can receive pressurized fluid from the supply line 113 and can return pressurized fluid to the hydraulic source 111 via a return line 114. Accordingly, the hydraulic fluid operates in a closed loop between the hydraulic source 111 and the actuators 112.

The hydraulic system 110 can further include one or more accumulators or other fluid energy storage devices 130 (two are shown in FIG. 2 as a first accumulator 130a and a second accumulator 130b). In a particular embodiment, each accumulator 130 can be a self-displacing accumulator, for example, a Model 445800, available from Parker Bertea Aerospace of Irvine, Calif. Accordingly, each accumulator 130 can include a chamber divider 131 that separates the accumulator 130 into a first chamber 132a and a second chamber 132b. A first piston 133a can be positioned in the first chamber 132a, and a second piston 133b can be positioned in the second chamber 132b. The first piston 133a and the second piston 133b can be coupled via a connecting shaft 134 that extends through the chamber divider 131.

The first chamber 132a can be coupled to the supply line 113, and the second chamber 132b can be coupled to the return line 114. The first chamber 132a can also be coupled to a pressurized gas source 117, so that one side of the first piston 133a is exposed to pressure provided by the pressurized gas source 117, and the opposite-facing side is exposed to pressure provided by hydraulic fluid in the supply line 113. The second piston 133b can have one side exposed to the hydraulic fluid in the return line 114, and the opposite-facing side exposed to atmospheric pressure.

In operation, both the first and second accumulators 130a, 130b can operate to store hydraulic energy. For example, when the hydraulic source 111 is activated, pressure is provided to the first piston 133a to drive the first piston against the resistance provided by the pressurized gas source 117 (e.g., from left to right in FIG. 2). If the pressure in the supply line 113 decreases, the force provided by the pressurized gas source 117 can drive the first piston 133a in the opposite direction (e.g., from right to left in FIG. 2) to provide pressurized hydraulic fluid to the supply line 113. Because the accumulators 130 are self-displacing, they move fluid into and out of the return line 114 as well as the supply line 113 during operation.

Each accumulator 130 can store hydraulic energy during a first phase of operation and release energy during a second phase. In a particular aspect of an embodiment shown in FIG. 2, the first accumulator 130a is configured to both store and release energy during normal operation of the hydraulic system 110, while the second accumulator 130b is configured to store energy during normal operation and release energy during non-normal operation (e.g., when the hydraulic source 111 has failed, or when the hydraulic system 110 otherwise undergoes a significant pressure drop). Typical operations for both accumulators 130a, 130b are described serially below.

Operation of the first accumulator 130a can proceed as follows. During normal operating conditions, the pressure provided to the first accumulator 130a via the supply line 113 "charges" the first accumulator 130a by driving the first piston 133a from left to right. During at least some intermittent periods, the load provided by the actuators 112 on the hydraulic system 110 may cause a pressure drop in the supply line 113. During such instances, the first accumulator 130a can release pressurized hydraulic fluid into the supply line 113 (with the first piston 133a moving from right to left) to provide additional or "boost" power to the actuators 112 for at least short periods of time. The amount of time during which the first accumulator 130a can provide such power depends upon the requirements of the actuators 112 and the storage capacity of the first accumulator 130a.

The second accumulator 130b can be coupled to the hydraulic system 110 in such a manner as to store power during normal operation of the hydraulic system 110, and release power only upon the occurrence of a specific triggering event that does not include normal system load fluctuations. Such an event can include a failure of one or more components of the hydraulic system 110 that produces a more significant pressure drop in the supply line 113. In a particular embodiment, a check valve 115 can be positioned in series between the supply line 113 and the second accumulator 130b. Accordingly, when the pressure in the supply line 113 exceeds the pressure provided by the pressurized gas source 117, the second accumulator 130b charges.

When the pressure in the supply line 113 decreases below the pressure of the pressurized gas source 117, the check valve 115 prevents (or at least restricts) hydraulic fluid from immediately being dispensed back into the supply line 113. Instead, the system 110 can include a selector or control valve 118 that can be selectively activated to release energy stored in the second accumulator 130b. Accordingly, the selector valve 118 can be changeable between a first configuration (e.g., a closed position) and a second configuration (e.g., an open position). In one aspect of this embodiment, the selector valve 118 can be coupled so as to release such energy to only the first actuator 112a. In other embodiments, the selector valve 118 can be coupled so as to provide such power to more (and in some cases, all) of the actuators 112. In any of these embodiments, the selector valve 118 can be directed by a controller 119. The controller 119 can be a manual controller, a semi-automatic controller, or a fully automatic controller. For example, the controller 119 can include a handle or other manually driven device so that an operator must physically manipulate the controller 119 to actuate the selector valve 118 and move it from a closed position to an open position. In another embodiment (e.g., a semi-automatic arrangement), the controller 119 can include provisions for a manual input (e.g., a flight-crew actuated input device), but can, on receiving such a manual input, automatically direct the selector value 118 to open. In yet another embodiment (e.g., a fully automated embodiment), the controller 119 can automatically sense a state of the hydraulic system 110 and, based upon a change in that state, can automatically open the selector valve 118. For example, the controller 119 can be coupled to a pressure sensor 120 that detects the pressure in the supply line 113, and can automatically open the selector valve 118 when the pressure in the supply line 113 drops below a predetermined threshold. In other embodiments, the system 110 can include another sensor that detects a drop in system performance (or another change in system state) and can send an appropriate corresponding signal. When the controller 119 is automated or semi-automated, it can include a computer having hardware and/or software instructions that direct (e.g., via a control signal) the actuation of the selector valve 118. In still another embodiment, the selector valve 118 itself can be coupled to the supply line 113 and can be configured to open when the pressure in the supply line 113 drops below a threshold value.

Once the selector valve 118 has been opened, the second accumulator 130b can discharge pressurized hydraulic fluid to the first actuator 112a to allow operation of the first actuator 112a, at least for a limited period of time and/or over a limited actuation range. The second accumulator 130b can accordingly be sized and configured to handle the desired actuator load for the desired time period.

The system 110 can include other features that facilitate the use of a second accumulator 130b that is at least partially isolated (e.g., via the check valve 115) from the rest of the system 110. For example, the system 110 can include a bleed valve 116 and a restrictor 121 connected between a secondary supply line 122 and the return line 114. Because the second accumulator 130b does not automatically discharge when the pressure in the supply line 113 decreases, it may remain charged even after the hydraulic source 111 has been shut down (for example, when the aircraft on which the hydraulic system 110 is installed is powered down). In order to allow maintenance on the second accumulator 130b and/or associated fluid lines, the second accumulator 130b must be depressurized. The bleed valve 116 can provide this function, and the restrictor 121 can prevent the depressurization operation from occurring too quickly.

Figure 3:
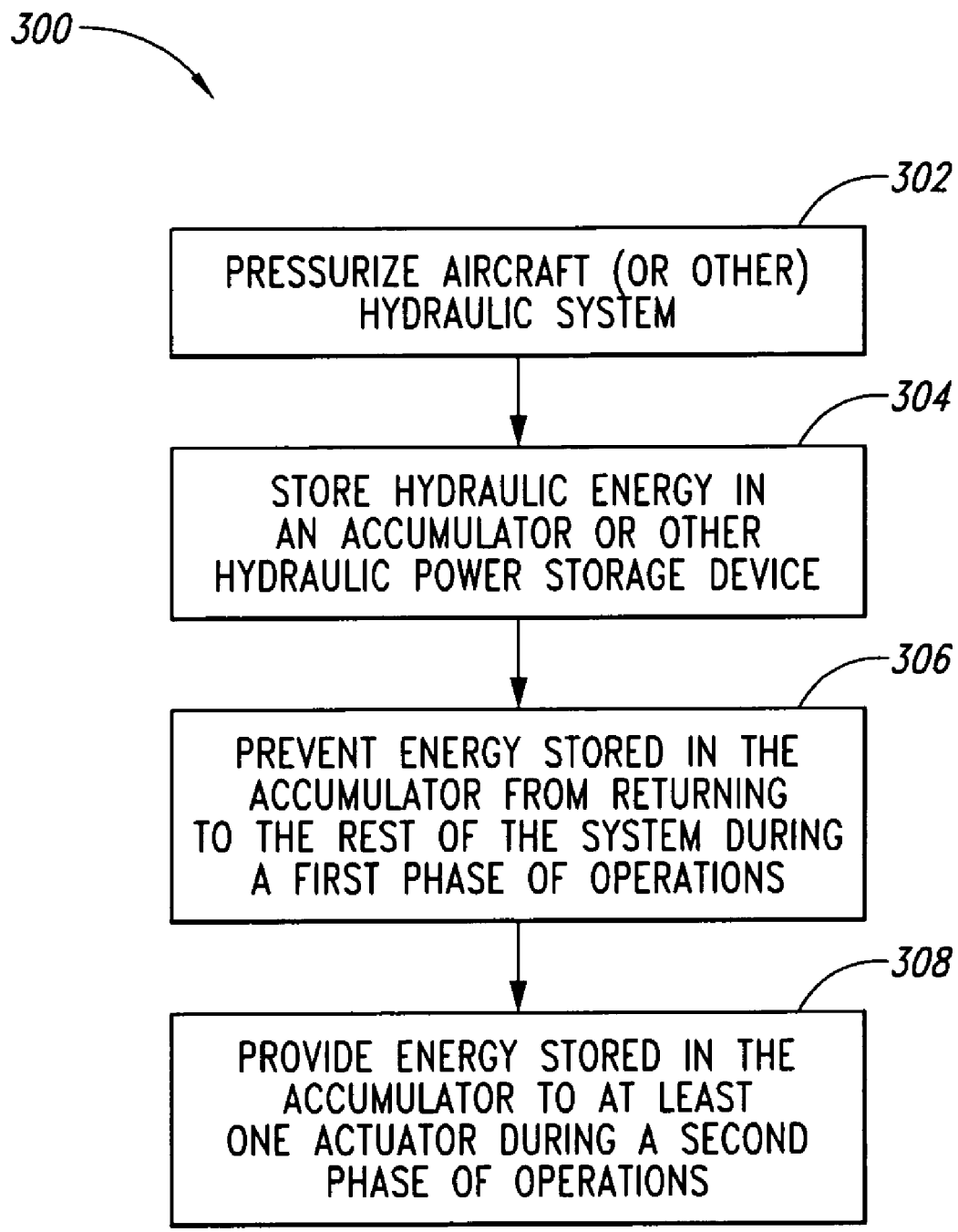
FIG. 3 is a flow diagram illustrating a method for providing power to an aircraft actuator in accordance with an embodiment of the invention.
Figure 4:
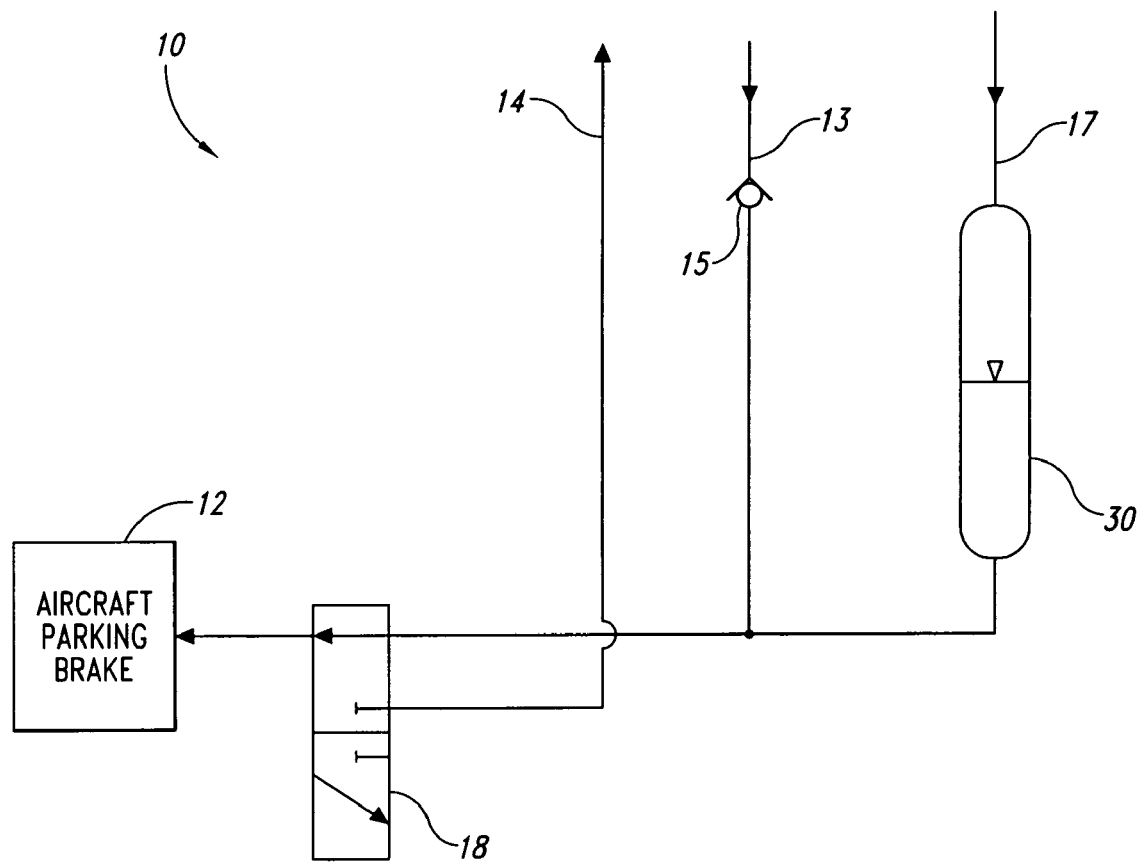
FIG. 4 is a schematic illustration of a portion of an aircraft hydraulic system in accordance with the prior art.

FIG. 3 is a block diagram illustrating a process 300 for operating a hydraulic system in accordance with an embodiment of the invention. In process portion 302, the process can include pressurizing an aircraft hydraulic system. Hydraulic energy can then be stored in an accumulator or other fluid energy storage device (process portion 304), for example, the second accumulator 130b described above with reference to FIG. 2. The energy stored in the accumulator can be prevented from returning to the rest of the system during a first phase of operations (process portion 306). For example, the check valve 115 and the selector valve 118 described above with reference to FIG. 2 can prevent the hydraulic energy stored in the second accumulator 130b from being released into the supply line 113 and the actuator(s) during normal operations. In process portion 308, energy stored in the accumulator can be provided to at least one actuator during a second phase of operations. For example, energy can be provided to an actuator that controls the deployment and retraction of an onboard aerial refueling system after hydraulic pressure falls below a predetermined threshold level as a result of a failure in the hydraulic system 110 or a portion of the system 110.

One feature of at least some embodiments of the systems described above with reference to FIGS. 1-3 is that they can include an accumulator or other fluid energy storage device that is selectively operable during only particular conditions.

Accordingly, the fluid energy storage device can be discharged only when a particular condition warrants it. An advantage of this arrangement is that the fluid energy storage device can remain charged until such a condition exists, even if other conditions that may place a strain on the hydraulic system are present. Such other conditions may include normal fluctuations in system pressure, and can be accommodated by a different fluid energy storage device, for example, the first accumulator 130a shown in FIG. 2.

Another feature of at least some embodiments of the systems described above with reference to FIGS. 1-3 is that the nature and type of actuator or actuators receiving power from the selectively discharged fluid energy storage device can be limited. For example, in some embodiments, not all aircraft actuators can receive power from the selectively discharged fluid energy storage device, but instead, a boom actuator or other designated actuator can be coupled to the selectively discharged fluid energy storage device to receive such power. An advantage of this arrangement is that in the event of a significant drop in hydraulic pressure, only the system or systems designated to receive power will receive such power. As a result, other systems that might otherwise take power away from the designated system are prevented from doing so. In a particular aspect of this embodiment, the boom actuator or other refueling system actuator can receive power in such instances, while other actuators which may be less important during a hydraulic system failure do not.

Still another feature of at least some embodiments of the systems and methods described above with reference to FIGS. 1-3 is that they can include self-displacing accumulators. Such accumulators operate to expel fluid from one side of the accumulator while taking in fluid on the other. An advantage of such an accumulator is that it does not require the hydraulic fluid reservoir to be increased in size when the accumulator is installed. Accordingly, the accumulator can be retrofitted into an existing hydraulic system without requiring changes to the reservoir. A follow-on advantage of this feature is that it can simplify a retrofit operation. Another follow-on advantage for both retrofit systems and new systems is that the reservoir can have a relatively small size, which reduces the overall weight of the aircraft on which it is installed.

Yet another feature of at least some embodiments of the systems and methods described above with reference to FIGS. 1-3 is that they can be specifically configured for ease of installation. This can be particularly advantageous when the system capabilities are to be retrofit into an existing system, and/or when the system is to be replaced. For example, in a particular embodiment shown in FIG. 2, selected components can be provided in a single line replaceable unit 170 (e.g., contained in a single housing) outlined by dashed lines in FIG. 2. The unit 170 can include the two energy storage devices 130, the pressurized gas source 117, the check valve 115 and the bleed valve 116. Optionally, the unit 170 can include other components as well, e.g., the selector valve 118. The unit 170 can be readily connected to an existing hydraulic system at connection points 171. An advantage of this arrangement is that the capabilities provided by the unit 170 (e.g., providing back-up hydraulic power to one or more selected hydraulic devices and smoothing out normal fluctuations in system pressure without requiring an increase in reservoir size) can be added to an existing hydraulic system without requiring significant changes to the existing system.

From the foregoing, it will be appreciated that specific embodiments of the invention have been described herein for purposes of illustration, but that various modifications may be made without deviating from the invention. For example, in some embodiments, the accumulators (or other energy storage devices) need not include self-displacing accumulators. In such cases, the accumulators need not be coupled to the return line. In other embodiments, the accumulator can be replaced with another suitable device for storing hydraulic energy. In still further embodiments, aspects of the invention can be applied to systems other than aerial refueling systems. For example, in some cases, actuators that drive devices in addition to or in lieu of deployable aerial refueling devices can be coupled to a selectively dischargeable accumulator. In still other embodiments, the hydraulic system 110 or aspects thereof can be applied to systems other than aircraft. Aspects of the invention described in the context of particular embodiments may be combined or eliminated in other embodiments. For example, the hydraulic system 110 need not include both the first accumulator 130a and the second accumulator 130b, but can instead include only the second accumulator 130b. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited except as by the appended claims.

We claim:

1. An aircraft system, comprising:
   a hydraulic fluid source;
   a hydraulic supply line coupled to the hydraulic fluid source;
   a hydraulic return line coupled to the hydraulic fluid source;
   a hydraulic aircraft actuator coupled between the hydraulic supply line and the hydraulic return line;
   a fluid energy storage device coupled to at least one of the hydraulic supply line and the hydraulic return line, the fluid energy storage device including the second of two accumulators;
   a first valve coupled between the fluid energy storage device and the at least one of the hydraulic supply line and the hydraulic return line to at least approximately prevent a flow of hydraulic fluid from the fluid energy storage device to the at least one of the hydraulic supply line and the hydraulic return line;
   a second, control valve coupled between the fluid energy storage device and the actuator, the control valve being changeable between a first configuration in which the control valve at least restricts fluid flow between the fluid energy storage device and the actuator, and a second configuration in which the control valve allows a flow of fluid to the actuator at least sufficient to operate the actuator;
   a first accumulator coupled to at least one of the supply line and the return line in parallel with the second accumulator and the first valve to provide fluid energy to the hydraulic supply line during normal system fluctuations; and
   a secondary supply line coupled to the control valve and connected at a point between the first valve and the second accumulator.

2. The system of claim 1, further comprising a controller coupled to the control valve to move the control valve between a closed position corresponding to the first configuration, and an open position corresponding to the second configuration.

3. The system of claim 2 wherein the controller includes a manual controller.

4. The system of claim 2 wherein the controller includes an at least partially automated controller.

5. The system of claim 1, further comprising:
a sensor coupled in fluid communication with hydraulic fluid provided by the hydraulic fluid source, the sensor being configured to detect a reduction in system performance and transmit a corresponding sensor signal; and
an automated controller operatively coupled to the sensor and the control valve, the controller being configured to direct a control signal to the control valve to change from the first configuration to the second configuration, based at least in part on the sensor signal transmitted by the sensor.

6. The system of claim 5 wherein the automated controller includes a computer-readable medium and wherein the computer-readable medium includes instructions to direct the control signal to the control valve to change from the first configuration to the second configuration, based at least in part on the sensor signal transmitted by the sensor.

7. The system of claim 1 wherein the first valve includes a check valve coupled in series between the supply line and the fluid energy storage device to prevent pressurized hydraulic fluid from passing from the fluid energy storage device through the check valve to the hydraulic supply line.

8. The system of claim 1 wherein the fluid energy storage device is coupled between the hydraulic supply line and the hydraulic return line in parallel with the hydraulic actuator.

9. The system of claim 1 wherein the actuator is one of multiple actuators coupled to the hydraulic fluid source, and wherein fewer than all the actuators coupled to the hydraulic fluid source receive energy from the fluid energy storage device when the control valve is in the second configuration.

10. The system of claim 1 wherein the second accumulator is coupled between the hydraulic supply line and the hydraulic return line in parallel with the hydraulic actuator, and wherein the first valve includes a check valve coupled in series between the accumulator and the hydraulic supply line.

11. The system of claim 1, further comprising:
a tanker aircraft carrying the hydraulic supply line, the hydraulic return line, the hydraulic actuator, the fluid energy storage device, the first valve and the control valve; and
a refueling device carried by the tanker aircraft, wherein the hydraulic actuator is coupled to the refueling device to move the refueling device between a stowed position and a deployed position.

12. The system of claim 1 wherein the system further comprises a bleed valve coupled to the secondary supply line, wherein the first and second accumulators, the first valve, and the bleed valve are housed in a single, line replaceable unit.

13. The system of claim 12 wherein the first accumulator is a first self-displacing accumulator and the second accumulator is a second self-displacing accumulator.

14. The system of claim 1, further comprising an aircraft carrying the hydraulic supply line, the hydraulic return line, the hydraulic actuator, the fluid energy storage device, the first valve, and the control valve.

15. The system of claim 1 wherein the first accumulator is a first self-displacing accumulator and the second accumulator is a second self-displacing accumulator.

16. An aircraft system, comprising:
a hydraulic fluid source;
a hydraulic supply line coupled to the hydraulic fluid source;
a hydraulic return line coupled to the hydraulic fluid source;
a hydraulic aircraft actuator coupled between the hydraulic supply line and the hydraulic return line;

a fluid energy storage device coupled to at least one of the hydraulic supply line and the hydraulic return line, the fluid energy storage device including the second of two accumulators:
a first valve coupled between the fluid energy storage device and the at least one of the hydraulic supply line and the hydraulic return line to at least approximately prevent a flow of hydraulic fluid from the fluid energy storage device to the at least one of the hydraulic supply line and the hydraulic return line;
a second, control valve coupled between the fluid energy storage device and the actuator, the control valve being changeable between a first configuration in which the control valve at least restricts fluid flow between the fluid energy storage device and the actuator, and a second configuration in which the control valve allows a flow of fluid to the actuator at least sufficient to operate the actuator;
a tanker aircraft carrying the hydraulic supply line, the hydraulic return line, the hydraulic actuator, the fluid energy storage device, the first valve, and the control valve;
a refueling boom carried by the tanker aircraft, wherein the hydraulic actuator is coupled to the refueling boom to move the refueling boom between a stowed position and a deployed position;
a first accumulator coupled to at least one of the supply line and the return line in parallel with the second accumulator and the first valve to provide fluid energy to the hydraulic supply line during normal system fluctuations; and
a secondary supply line coupled to control valve and connected at a point between the first valve and the second accumulator.

17. The system of claim 16, further comprising a bleed valve coupled to the secondary supply line.

18. The system of claim 16 wherein the first accumulator is a first self-displacing accumulator and the second accumulator is a second self-displacing accumulator.

19. An aerial refueling aircraft, comprising:
a fuselage;
a wing carried by the fuselage;
a fuel tank carried by at least one of the wing and the fuselage;
an aerial refueling device coupled to the fuel tank, the aerial refueling device being movable between a stowed position and a deployed position;
a hydraulic actuator coupled to the aerial refueling device to move the aerial refueling device between the stowed and deployed positions;
a hydraulic fluid source;
a hydraulic supply line coupled between the hydraulic fluid source and the hydraulic actuator;
a hydraulic return line coupled between the hydraulic fluid source and the hydraulic actuator;
first and second accumulators, the second accumulator being coupled between the hydraulic supply line and the hydraulic return line;
a pressurized gas source coupled to the accumulator;
a check valve coupled in series with the accumulator between the accumulator and the hydraulic supply line, wherein the first accumulator is coupled between the supply line and the return line in parallel with the second accumulator and the check valve to provide fluid energy to the hydraulic supply line during normal system fluctuations; and a control valve coupled between the accumulator and the hydraulic actuator, the control valve being changeable between a closed position in which the control valve at least restricts hydraulic fluid flow between the second accumulator and the hydraulic actuator, and an open position in which the control valve allows a flow of hydraulic fluid to the actuator at least sufficient to operate the actuator.

20. The system of claim 19 wherein each of the accumulators is a self-displacing accumulator.

21. The system of claim 19 wherein the first accumulator is a first self-displacing accumulator and the second accumulator is a second self-displacing accumulator, and wherein the first accumulator, the second accumulator and the check valve are housed in a single, line replaceable unit.

* * * * *

UNITED STATES PATENT AND TRADEMARK OFFICE
CERTIFICATE OF CORRECTION

PATENT NO. : 7,637,458 B2  Page 1 of 1
APPLICATION NO. : 11/440816
DATED : December 29, 2009
INVENTOR(S) : Daniel R. Near et al.

It is certified that error appears in the above-identified patent and that said Letters Patent is hereby corrected as shown below:

Title page, item (*) Notice: should read as follows: Subject to any disclaimer, the term of this patent is extended or adjusted under 35 U.S.C. 154(b) by 742 days.

On page 3, under "Other Publications", column 1, line 5-6, delete "MotorpPresse" and insert -- Motor-Presse --, therefor.

In column 10, line 4, in Claim 14, delete "accumulators:" and insert -- accumulators; --, therefor.

Signed and Sealed this

Twentieth Day of July, 2010

David J. Kappos
*Director of the United States Patent and Trademark Office*